US008756034B2

(12) United States Patent
Klöckner et al.

(10) Patent No.: US 8,756,034 B2
(45) Date of Patent: Jun. 17, 2014

(54) TEST INSTALLATION FOR ELECTRICAL FILTERS

(75) Inventors: Michael Klöckner, Fürth (DE); Michael Steingräber, Heroldsbach (DE); Andreas Zintl, Eggolsheim-Bammersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 330 days.

(21) Appl. No.: 13/132,356

(22) PCT Filed: Nov. 2, 2009

(86) PCT No.: PCT/EP2009/064418
§ 371 (c)(1),
(2), (4) Date: Jun. 2, 2011

(87) PCT Pub. No.: WO2010/063523
PCT Pub. Date: Jun. 10, 2010

(65) Prior Publication Data
US 2011/0238348 A1 Sep. 29, 2011

(30) Foreign Application Priority Data
Dec. 5, 2008 (DE) .................. 10 2008 060 597

(51) Int. Cl.
*G06F 11/30* (2006.01)
*B03C 3/00* (2006.01)
*B01D 46/00* (2006.01)
(52) U.S. Cl.
CPC . *G06F 11/30* (2013.01); *B03C 3/00* (2013.01); *B01D 46/00* (2013.01)
USPC ........... 702/182; 15/1.51; 73/865.8; 361/600; 702/34; 702/187; 702/188
(58) Field of Classification Search
CPC ............... B01D 46/00; B01D 46/0027; B01D 46/0032; B01D 46/42; B01D 49/00; B01D 2046/00; B03C 3/00; B03C 3/34; B03C 3/66; B03C 3/68; B03C 3/82; B03C 11/00; G01D 7/00; G01D 9/00; G01D 21/00; G06F 11/00; G06F 11/30; G06F 11/32; G06F 11/34; G06F 17/00; G06F 17/40; G06F 19/00
USPC ......... 702/65, 57, 81, 188, 1, 33, 34, 64, 108, 702/127, 182, 187; 15/1.51; 73/23.2, 28.01, 73/28.02, 53.01, 64.56, 432.1, 865.8, 73/865.9; 95/15; 96/15, 417; 210/85, 263, 210/600, 748.01, 767; 361/225, 600
IPC ............. B01D 46/00, 46/0027, 46/0032, 46/42, B01D 49/00, 2046/00; B03C 3/00, 3/34, B03C 3/66, 3/68, 3/82, 11/00; G01D 7/00, G01D 9/00, 21/00; G06F 11/00, 11/30, 11/32, G06F 11/34, 17/00, 17/40, 19/00
See application file for complete search history.

(56) References Cited

U.S. PATENT DOCUMENTS

| | | | |
|---|---|---|---|
| 2,883,255 A * | 4/1959 | Anderson | 346/34 |
| 3,266,293 A * | 8/1966 | Hubner | 73/23.2 |
| 3,321,613 A * | 5/1967 | Campbell | 702/182 |
| 3,362,217 A * | 1/1968 | Rush et al. | 73/112.01 |
| 3,375,700 A * | 4/1968 | Hubner | 73/31.02 |
| 3,415,108 A * | 12/1968 | Hubner | 73/31.05 |
| 3,772,851 A * | 11/1973 | Duffey | 95/12 |
| 3,827,217 A * | 8/1974 | Volsy | 96/51 |
| 4,860,149 A | 8/1989 | Johnston | 361/79 |
| 5,053,914 A | 10/1991 | Wessel et al. | 361/235 |
| 5,068,811 A * | 11/1991 | Johnston et al. | 700/297 |
| 5,591,249 A | 1/1997 | Hankins | 95/6 |
| 5,597,403 A | 1/1997 | Hankins | 96/23 |
| 6,829,551 B2 | 12/2004 | Von Der Hardt et al. | 702/114 |
| 2005/0237693 A1 | 10/2005 | Heckel et al. | 361/212 |

FOREIGN PATENT DOCUMENTS

| | | | |
|---|---|---|---|
| CA | 101168142 A | 4/2008 | B03C 3/66 |
| DE | 10135295 A1 | 2/2003 | B01D 65/10 |
| EP | 1872858 A2 | 1/2008 | B03C 3/02 |
| WO | 95/33568 | 12/1995 | B03C 3/013 |
| WO | WO 02/41974 A1 * | 5/2002 | |

OTHER PUBLICATIONS

German Office Action, German patent application No. 102008060597.2-41, 5 pages, Oct. 8, 2009.

International PCT Search Report and Written Opinion, PCT/EP2009/064418, 13 pages, Feb. 5, 2010.
Chinese Office Action, Application No. 200980148626.4, 9 pages, Apr. 22, 2013.

* cited by examiner

*Primary Examiner* — Edward Cosimano
(74) *Attorney, Agent, or Firm* — King & Spalding L.L.P.

(57) ABSTRACT

A test installation for electrical filter installations has, in the interior of a housing, a dust measurement device, a converter control cabinet, a feed for the converter control cabinet, a computer, connecting apparatuses for connecting the dust measurement device to a clean and a raw-gas dust channel of the electrical filter installation, cables for connecting the converter control cabinet to a high-voltage rectifier for the electrical filter installation, as well as a power connection, and wherein the housing has recesses for passing through at least the connecting apparatuses, the cable and power supplies for the feed and for the power connection.

17 Claims, 1 Drawing Sheet

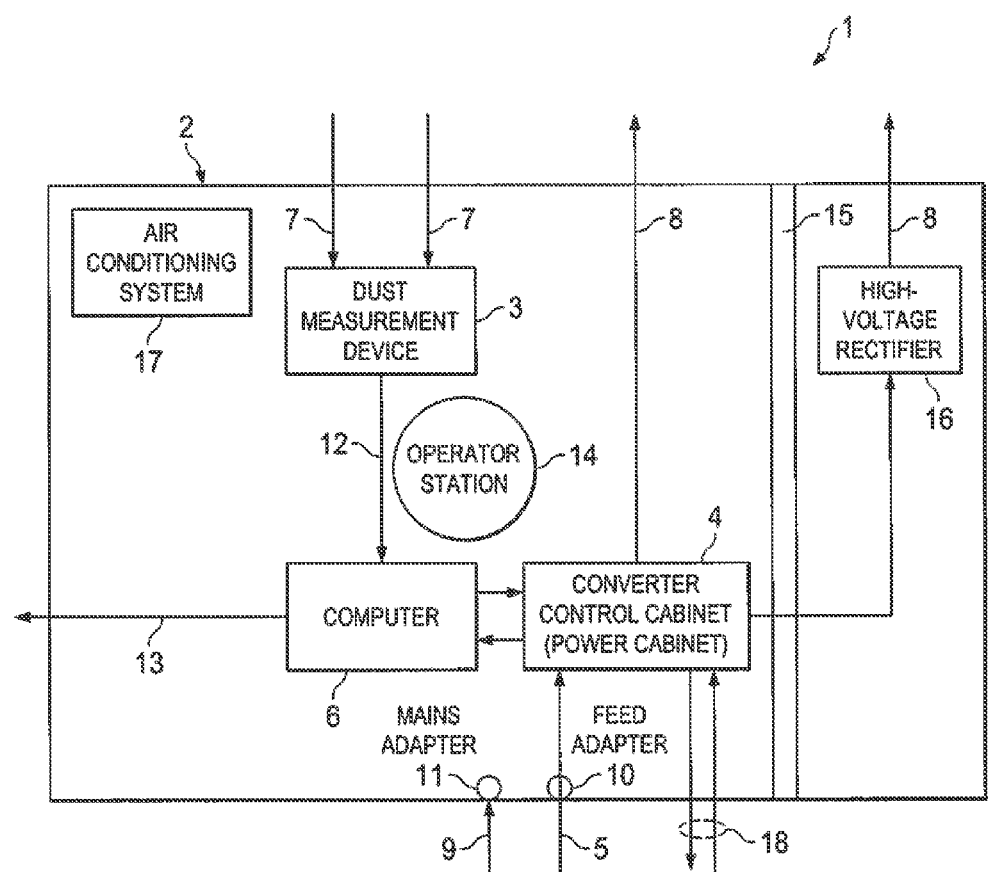

TEST INSTALLATION FOR ELECTRICAL FILTERS

CROSS-REFERENCE TO RELATED APPLICATIONS

This application is a U.S. National Stage Application of International Application No. PCT/EP2009/064418 filed Nov. 2, 2009, which designates the United States of America, and claims priority to German Application No. 10 2008 060 597.2 filed Dec. 5, 2008. The contents of which are hereby incorporated by reference in their entirety.

TECHNICAL FIELD

The invention relates to a test installation for electrical filter installations.

BACKGROUND

Electrical filters are used in the most wide-ranging technical processes for removing dust from gases. In such processes, a packet of separation electrodes is arranged in the gas stream, and spray electrodes, preferably in the form of wires, are inserted between these electrodes, a high DC voltage of the order of magnitude of about 40-150 kV being applied between the electrically parallel connected spray electrodes on the one hand and the separation electrodes on the other. As a result of this, the gas molecules are ionized and then give up their charge to the dust particles contained in the gas stream; these particles are negatively charged and as a result are drawn to the positively charged part of the electrodes. Here, they can be released by vibration or by means of stripping devices and then drop into a dust collection apparatus.

This principle enables widely differing particles to be separated from a wide range of gas streams, which, however, results in strongly varying operating parameters for an electrical filter depending on the application.

To increase the efficiency of existing electrical filter installations, new technologies for generating high voltages (converter systems) and/or optimizing the filter operation (PC-based optimization software) are being developed for example, as a result of which higher separation capacities and/or operation with lower energy consumption are made possible. Verification of the increased efficiency resulting from the use of these new technologies/optimizations is frequently required in advance. However, this verification cannot be theoretically determined in advance due to the complex influencing factors and changing operating parameters of the electrical filters. Test installations having one or more test units, which provide the verification under given operating conditions over an extended test phase (e.g. 1 month), are therefore produced.

When, for example, the new high-voltage generators consist of a converter control cabinet and a special high-voltage rectifier, then these must temporarily replace the existing high-voltage installations for test operation. To provide verification, a clean gas dust measurement and an energy consumption measurement are also required. The complexity and the necessary installation material for the test installation vary depending on the given local installation conditions and the existence of the necessary measuring systems, and must be engineered individually.

Previously, the new converter control cabinets have had to be erected in the vicinity of the control cabinets to be replaced to enable existing power and control cable connections to be reused. However, depending on the local space conditions, this is not possible in all cases, as a result of which new cables have to be laid temporarily. With existing mains voltages of more than 500 V, additional autotransformers, for example, for which a mounting location also has to be found, are often necessary. The expenditure for the changeover (transport/erection/disconnection and termination of the power/control cables) is therefore very high.

In addition, the existing high-voltage rectifiers are usually installed either in transformer pens or on the filter roof. The space conditions in the transformer pens do not usually allow further test equipment to be erected, as a result of which the existing high-voltage devices must first be removed and later refitted (which, depending on the possibility of transportation inside the building, may no longer be possible). When the equipment is erected on the filter roof, the cost of the temporary installation is likewise very high, as a crane and mechanical modifications are required for making the high-voltage connection.

As the electrical filter installation is out of operation during the conversion, the changeover to the test installation and later the reconversion to the existing equipment must be realized within the shortest possible time. The aforementioned conversion effort is however extremely high and requires significantly long down times.

Furthermore, when test installations have been erected in the past, these have sometimes been exposed to difficult ambient conditions (ambient temperature, air pollution etc.). In addition, the units are often damaged when being transported to and in particular within the installations, as a result of which a cost-intensive functional check/repair/cleaning is required before operation can be resumed.

SUMMARY

According to various embodiments, a test installation for electrical filter installations can be specified which overcomes the stated disadvantages.

According to an embodiment, a test installation for an electrical filter installation, wherein the test installation has, in the interior of a housing, a dust measurement device, a converter control cabinet, a feed for the converter control cabinet, a computer, connecting apparatuses for connecting the dust measurement device to a clean and a raw-gas dust channel of the electrical filter installation, cables for connecting the converter control cabinet to a high-voltage rectifier for the electrical filter installation, as well as a power connection, and wherein the housing has cut-outs for passing through at least the connecting apparatuses, the cables and power supplies for the feed and for the power connection.

According to a further embodiment, the housing can be designed as a seaworthy container. According to a further embodiment, the feed may have a feed adapter, by means of which the converter control cabinet can be connected to power supplies of different voltages. According to a further embodiment, the feed adapter can be designed as an autotransformer. According to a further embodiment, the power connection may have a mains adapter, by means of which the test installation can be connected to power supplies of different voltages. According to a further embodiment, the mains adapter can be designed as an autotransformer. According to a further embodiment, the computer and the dust measurement device can be connected to one another by means of a data connection. According to a further embodiment, the computer may have a data transmission interface, by means of which the test installation can be controlled remotely. According to a further embodiment, an operator station, which can be protected against high voltage by at least one electrically insulated wall, can be provided in the interior of the housing. According to a further embodiment, the test installation may have a high-voltage rectifier, which can be connected to the converter control cabinet, and cables for connecting the high-voltage rectifier to a high-voltage connection of the electrical filter installation. According to a further embodiment, the test installation may have an air conditioning system. According to a further embodiment, the interior of the housing may have air outlet channels with fans.

According to another embodiment, a program may determine an optimization potential of an electrical filter installation when running on a computer of a test installation as described above.

According to a further embodiment of the program, test procedures, which are set up in advance and which can be adapted to the respective electrical filter installation and environmental conditions, can be included. According to a further embodiment of the program, a remote function for the remote control of the test installation can be included.

According to yet another embodiment, a computer program product may comprise a program as described above.

BRIEF DESCRIPTION OF THE DRAWINGS

The invention is described and explained in more detail below with reference to the exemplary embodiment shown in the figure, which shows an exemplary embodiment of a mobile test installation.

DETAILED DESCRIPTION

According to various embodiments, a test installation for an electrical filter installation, may comprise, in the interior of a housing, a dust measurement device, a converter control cabinet, a feed for the converter control cabinet, a computer, connecting apparatuses for connecting the dust measurement device to a clean and a raw-gas dust channel of the electrical filter installation, cables for connecting the converter control cabinet to a high-voltage rectifier for the electrical filter installation, as well as a power connection, and wherein the housing has cut-outs for passing through at least the connecting apparatuses, the cables and power supplies for the feed and for the power connection. A major advantage of the solution according to various embodiments is that, regardless of the given places of use/erection conditions, all components necessary for test operation are installed in one housing and can therefore be transported easily. As a result of this, the verification of the optimization of the existing electrical filter, i.e. the increase in efficiency, is realized in a time and cost-optimized manner both for the customer and for the supplier, as the preparation and wrapping-up times for test operation are minimized. Transportation to and from the customer's premises can also be carried out more quickly.

As a result of being installed in one housing and the joint transportation of all components necessary for test operation—including the possibility of verifying the optimization potential by means of a dust measurement device before and after the electrical filter—the system is completely independent and can give the customer a rapid overview of the improvement potential. The necessary power/control cables including the high-voltage cable (usually up to 110 kV) are jointly transported on a specially designed cable drum arrangement which is matched to the circumstances of the housing. Advantageously, at 100 m, the cable lengths provided are dimensioned so that they enable almost all types of installation to be covered. The, for example, 110 kV electrical filter cable is fed out through a side wall of the housing in the form of a specially designed gland which is adapted to suit the circumstances of the housing. As this cable usually has to be laid on the roof of the electrical filter installation, advantageously a gantry with various crossbeams is also transported with the equipment.

With the solution according to various embodiments, the cost for the changeover (transport/erection/disconnection and termination of the power/control cables) is very low, as the existing high-voltage equipment (of the electrical filter installation to be optimized) remains in position and only the power connection of the converter control cabinet has to be implemented by means of a low-voltage cable to the high-voltage rectifier for the electrical filter installation. This results in significantly shorter system downtimes, as all preparations can be carried out while the electrical filter installation is in operation and a short shutdown is only necessary for making the high-voltage connection. Furthermore, a cost-intensive functional check/repair/cleaning can be dispensed with, as transport damage is extensively ruled out and rework is also not required due to optimum environmental conditions (protection by the housing). In addition, the organization and installation of missing measuring devices (especially the clean gas dust measurement) which may be necessary can be dispensed with, as a dust measurement device, which only has to be fitted on one side to the clean and raw-gas dust channel, is also jointly transported with the mobile solution according to various embodiments.

Other embodiments comprise a program and a computer program product.

The optimization of the test installation is carried out depending on the process parameters by means of this specially developed software, which is installed on the computer. Advantageously, test procedures are already set up in advance and therefore require only minimal modifications to suit the on-site conditions.

According to an embodiment, the housing is designed as a seaworthy container. The choice of a seaworthy container opens up the possibility of being able to carry out such test operations worldwide, wherein transportation can be carried out cost-effectively and in a simple manner using a housing which is standardized in this way.

In a further embodiment, the feed has a feed adapter, by means of which the converter control cabinet can be connected to power supplies of different voltages. Worldwide operation of the mobile unit (test installation) requires fully flexible adaptation to all installation and operating conditions which arise. By means of the feed adapter, the test installation can be fed from many voltage ranges without any problems (e.g. from 400 V to 700 V).

In a further embodiment, the power connection has a mains adapter, by means of which the test installation can be connected to power supplies of different voltages. The test installation's internal supply is therefore also variable (e.g. for USA 115 V, Europe 220 V).

Advantageously, at the same time, the feed adapter and/or the mains adapter are designed as autotransformers.

In a further embodiment, the computer and the dust measurement device are connected to one another by means of a data connection. In this way, the measurements of the dust measurement device can be automatically evaluated by the computer and the verification of the possible increase in efficiency (the optimization potential) can be provided.

In a further embodiment, the computer has a data transmission interface, by means of which the test installation can be controlled remotely. Advantageously, for this purpose, a remote function for the remote control of the test installation is included in the program which runs on the computer. At the same time, the interface can be designed in the usual form (modem/Internet/WLAN etc.). As the test installation can be erected and dismantled by installation personnel, and the commissioning and the actual test operation as well as the monitoring of the system do not have to be carried out on site due to the remote function, commissioning/service personnel are only rarely required on site for commissioning the test installation and for test operation, as a result of which further costs can be saved.

In a further embodiment, an operator station, which is protected against high voltage by at least one electrically insulated wall, is provided in the interior of the housing. This guarantees personnel safety for operators working on the test installation at the operator station, which is preferably provided at the PC.

In a further embodiment, the test installation has a high-voltage rectifier, which can be connected to the converter control cabinet, and cables for connecting the high-voltage rectifier to a high-voltage connection of the electrical filter installation. By this means, optionally, the high-voltage rectifier in the existing electrical filter installation can continue to be used in test operation (hybrid operation) or operation via the special high-voltage rectifier located in the housing can be realized. For this type of installation, in order to guarantee a highest possible flexibility, the necessary power/control cables including the high-voltage cable (usually up to 110 kV) are also transported with the equipment in a length of advantageously 100 m on cable drums which are designed for these requirements.

In a further embodiment, the test installation has an air conditioning system. This enables the sometimes considerable heat development (of power cabinet, autotransformer, transformer for example) inside the housing and the possible heating which additionally occurs at high external temperatures and in sunshine to be countered.

In a further embodiment, the interior of the housing has air outlet channels with fans. This not only provides improved ventilation (which can be an advantage for operating personnel in the interior of the housing, for example), but also counters a heat development, if necessary in conjunction with an air conditioning system.

Overall, it is a characteristic of the various embodiments that all components necessary for test operation are installed in a mobile housing regardless of the given erection conditions. The choice of a seaworthy container opens up the simple possibility of being able to carry out such test operations worldwide without a costly dispatch of individual components. As described, the container solution advantageously includes the flexible feed of different connection voltages, the integration of a complete converter high-voltage installation, an operator station with a PC solution for optimization and remote control of the test installation, the integration of all necessary connecting cables including installation apparatus for laying the cables to the electrical filter (for hybrid operation or operation with integral high-voltage generator), the air conditioning of the container and the joint transportation of the dust measurement device. At the same time, all the DIN-VDE specifications relevant to the test operation and the UL standards for the USA are complied with. If it is necessary to install a plurality of high-voltage generators, a plurality of containers can be put together in the form of modules.

The figure shows a schematic representation of a mobile test installation 1 in a housing 2, which advantageously is designed as a seaworthy container 2. A dust measurement device 3 and connecting apparatuses 7 for fitting the dust measurement device 3 to the clean and raw-gas dust channel of the electrical filter installation are located in the interior of the container 2. For automatically providing the verification of the optimization potential, the dust measurement device 3 is connected via a data connection 12 to a computer 6, which is also provided for controlling the test installation 1 and which can be remotely controlled by means of a data transmission interface 13. On the one hand, the optimization of the test installation 1 is carried out as a function of the respective process parameters by means of the specially developed software which is installed on the computer 6, and on the other hand the software provides all the tools (such as diagnostic tools, for example) which are necessary for a remote control via modem/Internet. The container 2 is equipped with an operator station 14 which, for personnel safety, is separated from the high-voltage side by an electrically insulated wall 15 inside the container.

The converter control cabinet (power cabinet) 4 is connected to the computer 6. The power cabinet 4 has a feed 5 which is fitted with a feed adapter 10 (for example an autotransformer) for connecting to different voltage ranges (e.g. from 400 V to 700 V). The converter control cabinet 4 is also connected by means of a control cable (bus) 18 to the electrical filter installation. The converter control cabinet 4 can optionally be connected to an existing high-voltage rectifier for the electrical filter installation by means of connecting cables 8 (hybrid operation) or to a special high-voltage rectifier 16 located in the container 2 which is then connected directly to the electrical filter by means of connecting cables 8.

The sometimes considerable heat development due to power cabinet 4, autotransformer 10 etc. inside the container 2 and the additional heating of the container 2 which occurs at high external temperatures and in sunshine is countered by a special air conditioning technology in the form of an air conditioning system 17 and special air outlet channels with fans (not shown). Furthermore, a power connection 9, which is likewise equipped with a mains adapter 11 designed in the form of an autotransformer for a highest possible flexibility (mains voltage in the USA 115 V, in Europe 220 V, for example), is provided for the internal supply of the container 2 (for computer 6, air conditioning system 17 etc.). Not shown in the figure are the cable drums which are required for the jointly transported cables 8 and which are adapted to the container solution, and the crossbeams which may be necessary for laying the cables and which likewise can be jointly transported in the container 2.

In summary, various embodiments relate to a test installation for electrical filter installations. In order to overcome the disadvantages of the known test installations, in which individual components sometimes have to be fitted in place of the corresponding components of the electrical filter installation which results in a greater cost for the conversion (transport/erection/disconnection and termination of the power/control cables) and therefore long system downtimes, a test installation for an electrical filter installation is proposed, wherein the test installation has, in the interior of a housing, a dust measurement device, a converter control cabinet, a feed for the converter control cabinet, a computer, connecting apparatuses for connecting the dust measurement device to a clean and a raw-gas dust channel of the electrical filter installation, cables for connecting the converter control cabinet to a high-voltage rectifier for the electrical filter installation, as well as a power connection, and wherein the housing has cut-outs for passing through at least the connecting apparatuses, the cables and power supplies for the feed and for the power connection. In this way, all components necessary for the test operation are installed in an easy-to-transport housing which advantageously is designed as a seaworthy container, and only a short downtime of the electrical filter installation is required for connecting the high voltage.

What is claimed is:

1. A test installation for an electrical filter installation, comprising:
   a housing defining an interior and an exterior,
   a dust measurement device disposed within the interior of the housing along with connecting apparatus configured to connect the dust measurement device to a clean and a raw-gas dust channel of the electrical filter installation,
   a power converter control cabinet disposed within the interior of the housing,
   a feed for the power converter control cabinet connecting the power converter control cabinet to the exterior of the housing,
   a computer disposed within the interior of the housing providing a user interface for operation of the test installation, and
   cables connecting the power converter control cabinet to a high-voltage rectifier for the electrical filter installation and a power connection, and
   wherein the housing defines cut-outs for passing through at least the connecting apparatuses, the cables, and the power supplies for the feed and for the power connection.

2. The test installation according to claim 1, wherein the housing comprises a seaworthy container.

3. The test installation according to claim 1, wherein the computer and the dust measurement device are connected to one another by means of a data connection.

4. The test installation according to claim 1, wherein the computer includes a data transmission interface, by means of which the test installation can be controlled remotely.

5. The test installation according to claim 1, further comprising an operator station protected against high voltage by at least one electrically insulated wall, the operator station disposed within the interior of the housing.

6. The test installation according to claim 1, further comprising a high-voltage rectifier connected to the power converter control cabinet and cables for connecting the high-voltage rectifier to a high-voltage connection of the electrical filter installation.

7. The test installation according to claim 1, further comprising an air conditioning system.

8. The test installation according to claim 1, wherein the housing defines air outlet channels with fans.

9. The test installation according to claim 1, wherein the feed includes a feed adapter, by means of which the converter control cabinet can be connected to power supplies of different voltages.

10. The test installation according to claim 9, wherein the feed adapter comprises an autotransformer.

11. The test installation according to claim 1, wherein the power connection includes a mains adapter, by means of which the test installation can be connected to power supplies of different voltages.

12. The test installation according to claim 11, wherein the mains adapter comprises an autotransformer.

13. A method for testing an electrical filter installation by means of a test installation comprising, in the interior of a housing, a dust measurement device, a power converter control cabinet, a feed for the converter control cabinet, a computer, and a power connection, the method comprising:
   connecting the dust measurement device to a clean and a raw-gas dust channel of the electrical filter installation through cut outs defined in the housing wall,
   connecting the power converter control cabinet to a high-voltage rectifier for the electrical filter installation,
   connecting the power connection through cut outs defined in the housing wall, and
   operating a test protocol stored in non-transitory memory of the computer configured to measure dust with the dust measurement device.

14. The method according to claim 13, further comprising connecting by means of a feed adapter the converter control cabinet to power supplies of different voltages.

15. The method according to claim 13, further comprising connecting by means of a mains adapter the test installation to power supplies of different voltages.

16. The method according to claim 13, further comprising connecting the computer and the dust measurement device to one another by means of a data connection.

17. The method according to claim 13, further comprising controlling by means of a data transmission interface the test installation remotely.

* * * * *